United States Patent [19]

Lardiere, Jr. et al.

[11] Patent Number: 5,790,026
[45] Date of Patent: Aug. 4, 1998

[54] INTEGRATED PLANAR ICE DETECTOR

[75] Inventors: Benjamin G. Lardiere, Jr., Milford; Bruce F. Wells, Oxford, both of Conn.

[73] Assignee: DNE Technologies, Inc., Wallingford, Conn.

[21] Appl. No.: 543,484

[22] Filed: Oct. 16, 1995

[51] Int. Cl.⁶ .................................................. G08B 21/00
[52] U.S. Cl. ................ 340/581; 244/134 D; 244/134 F
[58] Field of Search ................... 340/581; 244/134 D, 244/134 F

[56] References Cited

U.S. PATENT DOCUMENTS

4,333,004  6/1982  Forgue et al. ........................ 340/581

*Primary Examiner*—Glen Swann
*Attorney, Agent, or Firm*—Bachman & Lapointe, P.C.

[57] ABSTRACT

An apparatus for detecting ice forming conditions includes a substrate having a first surface and a second surface; a sensor disposed on the first surface, the sensor being made of a material having a characteristic which varies in a known manner with respect to temperature; and a unit for monitoring the characteristic and for detecting ice forming conditions from the characteristic. A method for positioning the apparatus to detect ice forming conditions, to detect the presence of ice, and to determine an ice accretion rate is also provided.

45 Claims, 4 Drawing Sheets

INTEGRATED PLANAR ICE DETECTOR

BACKGROUND OF THE INVENTION

The invention relates to an apparatus for detecting ice and ice forming conditions, especially for use with vehicles such as aircraft.

Aircraft may easily be disabled by the formation of ice upon them. Aircraft and other vehicles frequently encounter ice forming conditions. Accordingly, the detection of weather conditions which permit the formation of ice on an aircraft or other vehicle is of great practical concern.

A prior art ice detection apparatus is disclosed in U.S. Pat. No. 4,333,004 to Forgue et al. The '004 patent discloses an apparatus for detecting ice forming weather conditions using a probe assembly including a probe tube extending at an angle to the direction of movement of the vehicle. Sensor and reference wires are positioned in separate thread grooves on the probe for protection and are wound repeatedly around a portion of the probe tube. A heater is fitted within a hollow cavity of the probe tube to facilitate melting of ice which forms on the sensor wire.

The apparatus according to the '004 patent is useful in certain situations for detecting ice and ice forming conditions. The device according to the '004 patent is particularly useful for positioning with the probe tube extending into an air flow of particular relevance or importance such as the engine inlet of an airplane where the probe could extend into a stream of interest. However, the need remains for an apparatus which can be used to determine whether ice forming conditions exist specifically at a particular structural surface of the vehicle in question. Under these circumstances, the probe tube of the '004 patent is unable to provide accurate measurements because the sensor wires are separated from the surface of interest by the length of the tube. Thus, the conditions measured by the probe of the '004 patent may not accurately reflect the conditions at the actual surface which must be monitored for ice formation.

It is apparent that the need remains for an ice detector which accurately detects ice and ice forming conditions at a surface of interest such as planar, substantially curved, or non-flat surfaces of a vehicle.

It is therefore the primary object of the present invention to provide an ice detector for detecting ice and ice forming conditions for use in monitoring conditions at flat and non-flat surfaces of a vehicle.

It is another object of the invention to provide an ice detector which is readily applied to flat or non-flat surfaces of a vehicle for accurately detecting ice and ice forming conditions at the surface.

It is still another object of the present invention to provide an ice detector which allows for rapid heating of the ice detecting sensor to remove ice from the sensor and rapid cooling to ready the sensor for continued detection of ice forming conditions and the presence of ice.

It is a further object of the invention to provide an ice detector which is simple in manufacture and both reliable and versatile in use.

It is a still further object of the present invention to provide an ice detector which measures accreted ice thickness and icing rate.

It is another object of the invention to provide a method for using an ice detector according to the invention to detect ice forming conditions, the presence of ice, and ice accretion rate.

Other objects and advantages of the present invention will appear hereinbelow.

SUMMARY OF THE INVENTION

In accordance with the invention, the foregoing objects and advantages are readily attained.

According to the invention, an apparatus is disclosed for detecting ice forming conditions which apparatus comprises a substrate having a first surface and a second surface; a sensor disposed on said first surface, said sensor comprising a material having a characteristic which varies in a known manner with respect to temperature; and control means associated with said sensor for monitoring said characteristic and for detecting ice forming conditions from said characteristic.

The apparatus according to the invention preferably further includes a heater disposed on said second surface for heating said sensor, and said control means further comprises means for activating said heater after ice forming conditions have been detected, whereby said sensor is readied for additional detection of ice forming conditions.

A method is also disclosed for detecting ice forming conditions in an environment at a location of interest, which method comprises steps of: providing a detector comprising a substrate having a first surface and a second surface, and a sensor disposed on said first surface, said sensor comprising a material having at least one characteristic which varies in a known manner with respect to temperature; positioning said detector at said location with said first surface facing said environment; monitoring said at least one characteristic to determine said temperature; and indicating whether said temperature indicates ice forming conditions.

BRIEF DESCRIPTION OF THE DRAWINGS

A detailed description of preferred embodiments of the invention follows with reference to the attached drawings wherein.

DETAILED DESCRIPTION

The invention relates to a detector apparatus for detecting ice forming conditions and the presence or absence of ice. The detector according to the invention finds use especially with respect to the detection of ice and ice forming conditions in a vehicular environment, especially aircraft. Detection of ice and ice forming conditions is of extreme importance with respect to aircraft since the formation of ice on aircraft can partially or entirely disable some or all functions of the aircraft making the aircraft difficult or impossible to control.

Referring to the drawings, a detector according to the invention will be described which detector allows accurate and reliable indication of ice forming conditions and the presence of ice at a desired surface or location.

Figure 1:
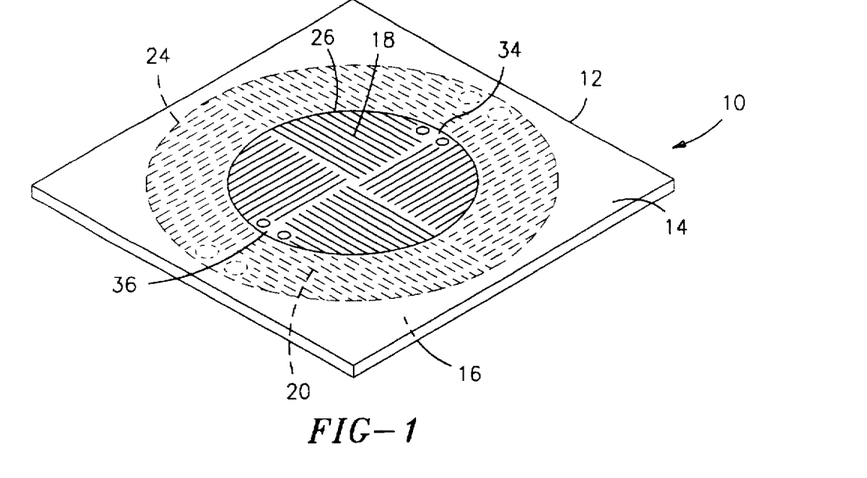
FIG. 1 is a perspective view of an ice detector according to the present invention.

Referring to FIG. 1, an ice detector according to the invention is illustrated and generally referred to by reference numeral 10. According to the invention, ice detector 10 preferably has a thin, flat and preferably flexible substrate member 12 having a first surface 14 and a second opposed surface 16, a sensor element 18 disposed on first surface 14, and a heater element 20 (shown in dashed lines) disposed on second surface 16. For clarity, substrate 12 is shown in the drawings having an exaggerated thickness. Substrate 12 is actually preferably a thin film or sheet of material having a thickness of several mils, most preferably less than or equal to about 1 mil.

As will be discussed below, sensor element 18 has a characteristic, preferably resistance, which is related in a known manner to the temperature of sensor element 18 so that this characteristic can be monitored to determine the temperature of sensor element 18. According to the invention, sensor element 18 is positioned at a location of interest, for example a location of an aircraft which is particularly prone to icing, and sensor element 18 is monitored to determine whether the characteristic indicates a temperature which would allow the formation of ice.

Also as will be discussed below, ice detector 10 according to the invention is useful for detecting the presence of ice on sensor element 18 by providing a pulse of current through sensor element 18 and monitoring the resulting temperature increase of sensor element 18. The energy required to melt meteorological ice forming on sensor element 18 results in a detectable difference in the temperature increase profile of sensor element 18 depending upon the presence or absence of ice. This detectable difference is monitored by detector 10 according to the invention to detect the presence of ice.

Heater element 20 according to the invention serves to rapidly raise the temperature of sensor element 18 after the detection of ice to a temperature above the ice formation temperature to ensure the removal of ice from sensor element 18 so that detector 10 can be rapidly returned to ice forming conditions detect mode.

A particular advantage of the present invention resides in that detector 10 may be positioned at a particular point of interest on a surface 22 (FIG. 2) and accurate and reliable measurements as to ice forming conditions and the presence of ice at that location can be obtained. The preferred flexibility of substrate 12 according to the invention allows detector 10 to be positioned for use on non-flat surfaces 22A (FIG. 3) thereby greatly enhancing the versatility of detector 10 according to the invention. Thus, detector 10 according to the present invention allows for the monitoring of conditions at a specific point of interest at the surface of an aircraft or other structure as opposed to prior art devices which provide an indication as to conditions at a point spaced from a structural surface which may be the actual point of interest.

A further advantage of the present invention is that ice detector 10 may be used to monitor the rate of accretion of ice as well. This function is facilitated by the rapid return of detector 10 to ice sensing operation after a detection of ice and a heating to remove ice. As will be discussed below, the configuration of ice detector 10 according to the invention will result in a known approximate amount of ice accretion before ice is detected, for example, an ice thickness of about 3.5 to about 4.0 mils. Ice detector 10 according to the invention preferably monitors the number of ice detections over a known period of time so as to provide a measurement of the rate of ice accretion.

According to the invention, substrate member 12 is preferably a thin, flat sheet or film of flexible material which is relatively heat conductive and which is substantially electrically non-conductive. Substrate member 12 may advantageously be a substantially planar member, preferably flexible so as to adapt to the contour of a surface of interest. Alternatively, substrate member 12 may be non-flexibly formed or adapted to a particular desired non-flat or contoured surface. A non-flexible preformed substrate 12 may be desired for example for use in a detector 10 manufactured for use in a particular area of interest having a known contour.

Substrate member 12 may preferably be a film formed from plastics such as nylon, teflon, lexan, delrin, kevlar, polyurethane, polyimide and the like, although ceramic material, glass epoxy, or any other suitable organic or non-organic material which possesses the desired characteristics with respect to heat conductance and electric non-conductance and with respect to resistance to anticipated environmental conditions may be used according to the invention. Substrate member 12 is most preferably a thin, flexible polyimide film.

Substrate member 12 is preferably made of a material which is flexible so that, advantageously, detector 10 can be positioned on non-flat or irregularly shaped surfaces or portions of an aircraft or other structure to be monitored. Flexible substrate 12 readily conforms to the shape of the structure so that conditions can be monitored by detector 10 at the surface of interest.

Substrate member 12 serves according to the invention to provide electric insulation between sensor 18 and heater 20 so as to prevent shorts between sensor 18 and heater 20 and to insure proper operation of each device, and to nevertheless provide close proximity of heater 20 and sensor 18 so that heater 20 can be used to rapidly heat sensor 18 as desired. Substrate member 12 preferably has a thickness of less than or equal to about 1 mil.

Sensor element 18 preferably comprises one or more runs of an electrically conductive material disposed on first surface 14 of substrate 12. Sensor element 18 as set forth above is preferably provided from a material having a resistance which is related, preferably directly proportionally, to the temperature of the material. The preferred materials for sensor element 18 have a resistance which changes according to the temperature of the material according to a well known and documented relation. Examples of suitable materials include nickel, platinum, copper and the like, and mixtures thereof. Of course, numerous other materials which have some detectable or measurable characteristic which is related in a known manner to the temperature of the material may also be used for sensor element 18.

According to the invention, nickel is particularly well suited for use according to the invention because nickel can be deposited or otherwise disposed on substrate 12 in a manner that is resistant to erosion or other adverse affects of the environment to which detector 10 is to be exposed. Nickel is also preferred due to its familiar conductivity and temperature coefficient properties.

Sensor element 18 may be provided on substrate 12 according to numerous conventional processes, and is preferably molecularly bonded to substrate 12 using a reverse plating or etching process wherein runs of the desired material are deposited on the substrate in a desired pattern. For example, photoresist materials may be used according to the invention to etch paths into substrate 12, and sensor material may subsequently be deposited into the paths so formed. After deposit of the sensor material, additional photoresist materials may be used to etch away remaining substrate material so as to provide the desired gaps between runs of sensor material as will be described below. Other methods may be used according to the invention to provide sensor material in a desired configuration on substrate 12. For example, sensor element 18 may be adhesively bonded or otherwise disposed on substrate 12, although molecular bonding is preferred.

Heater 20 may also preferably be provided as one or more runs of electrically conductive material which heats rapidly responsive to the passing of a sufficient current. According to the invention, a particularly preferred material is nickel because it is advantageous to provide heater 20 of a material which is characterized by an increase in resistance responsive to an increase in temperature. Heater 20 may be provided on second surface 16 of substrate 12 in any known manner and may be provided using reverse plating and photoresist materials as set forth above with respect to sensor element 18 if desired. Numerous other types of heaters are known which could also be used according to the invention to provide a rapid heating of sensor element 18 to a temperature above ice forming conditions so as to remove ice from sensor element 18 and thereby to prepare sensor element 18 for the next ice detection cycle.

Referring to FIG. 1, heater 20 is preferably provided on second surface 16 of substrate 12 having a perimeter 24 which overlaps and extends beyond a perimeter 26 of sensor element 18. As shown in FIG. 1, sensor element 18 and heater 20 may be provided in substantially circular configuration, and heater 20 in this embodiment preferably has a larger diameter than sensor element 18. This is particularly advantageous in that heater 20, when heated, thereby serves to remove ice from sensor element 18 and an additional area around sensor element 18 so that sensor element 18 is not screened from actual conditions by a surrounding build up of ice. FIG. 1 shows heater 20 extending beyond sensor element 18 in all directions. This is particularly advantageous if it is not known from what direction the weather conditions, particularly wind direction, will approach detector 10. Thus, ice build up is prevented in all directions for a sufficient area around sensor element 18. If the direction of weather conditions such as wind is known, heater 20 may suitably be provided extending beyond sensor element 18 in specific directions only, if desired.

According to the invention, detector 10 is flexible and very thin so as to provide a detector 10 having increased versatility in use at various locations. The planar, thin nature of detector 10 according to the invention advantageously allows detector 10 to be positioned directly at locations of concern without significantly affecting the aerodynamics of that surface of the vehicle or aircraft. In this regard, substrate 12 may be provided having a thickness preferably less than or equal to about 1 mil. This has the advantage of reducing the overall thickness of detector 10 and enhancing the heat transmission from heater 20 on one side of substrate 12 to the sensor element 18 on the other side of substrate 12. Sensor element 18 is preferably provided having a thickness of greater than or equal to about 2 mils so as to provide enhanced ice detection performance. Heater element 20 is also preferably provided having a thickness of approximately 0.1 mil. Sensor element 18 and heater 20 are also preferably provided on substrate 12, for example according to the reverse plating technique discussed above, so that sensor element 18 and heater 20 are flexible whereby substrate 12 can be mounted to non-flat surfaces as desired without adversely affecting sensor element 18 or heater 20.

Figure 2:
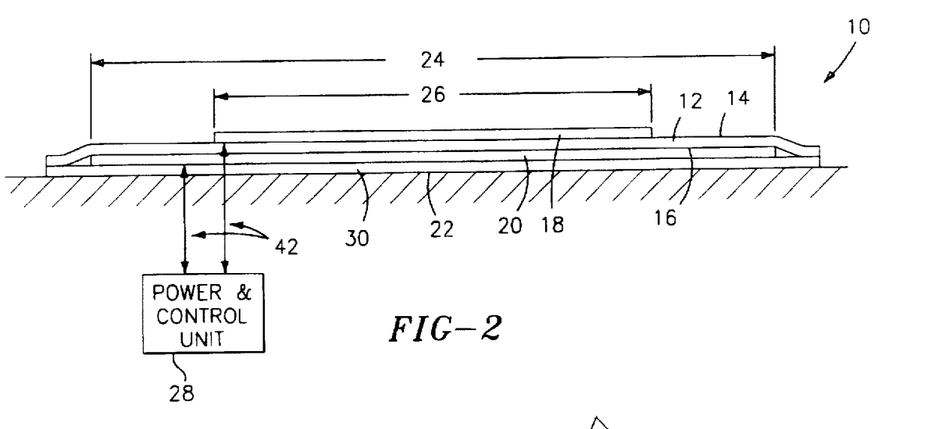
FIG. 2 is a side schematic view of an ice detector according to the invention.
Figure 3:
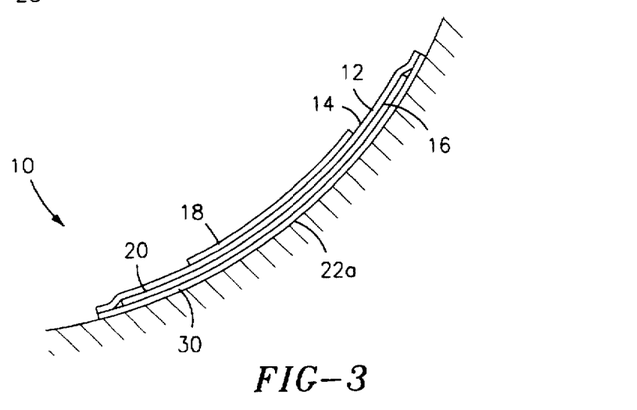
FIG. 3 is a side schematic view of an ice detector according to the invention applied to a non-flat surface.

Referring to FIG. 2, detector 10 is schematically illustrated in position on a surface 22. A power and control unit 28, schematically illustrated in FIG. 1, is provided for powering sensor element 18 and heater 20 and for monitoring sensor element 18 so as to determine the temperature of same. Unit 28 will be described in greater detail below. A mounting substrate member 30 may also be provided between heater 20 and surface 22 so as to insulate heater 20 from surface 22 and the vehicle to which detector 10 is mounted. As illustrated in FIG. 3, detector 10 according to the invention can be mounted to various non-flat, simple curved or complex curved surfaces 22a for providing accurate determinations of ice forming conditions and the presence of ice. The flexible nature of the elements of detector 10 thereby serve to enhance the versatility of detector 10. FIG. 3 shows detector 10 positioned on a simple curved surface 22a. It should be appreciated that the flexible nature of substrate 12, sensor element 18 and heater 20 allows detector 10 to be positioned on complex or compound curved non-flat structures or surfaces as well.

Figure 4:
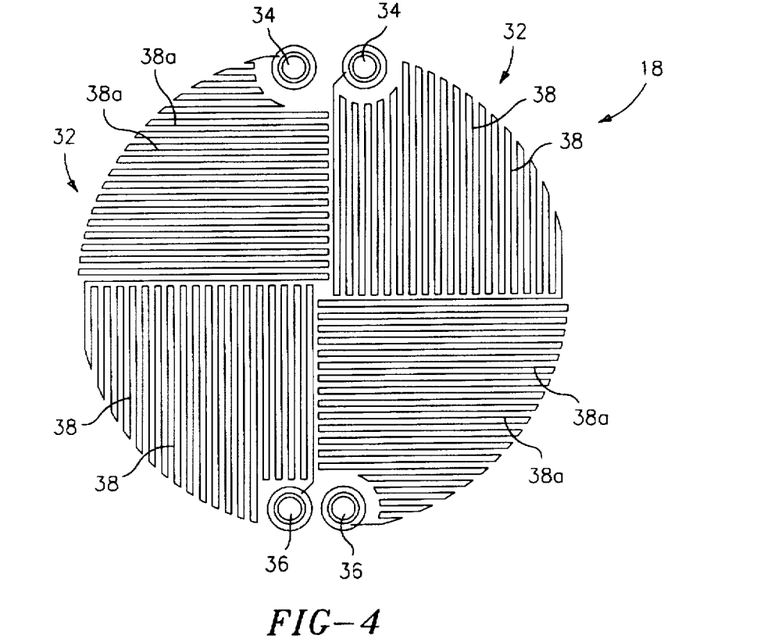
FIG. 4 is a top schematic view of a configuration of the sensor element of an ice detector according to a preferred embodiment of the invention.

Referring to FIG. 4, a preferred configuration of sensor element 18 is illustrated. As shown, sensor element 18 may preferably be provided as a run 32 of nickel or other suitable material positioned between contacts 34, 36 for connection to unit 28. Run 32 preferably includes a plurality of run segments 38 oriented in a parallel manner as shown. Further, run 32 preferably has a first plurality of run segments 38 and a second plurality of run segments 38a which are arranged at an angle, preferably substantially perpendicular, to each other. It has been found that the effectiveness of detector 10 according to the invention is enhanced depending upon the orientation of resultant wind and weather conditions with respect to the direction of the run. The orientation of FIG. 4 serves to ensure that a portion of sensor element 18 will be advantageously oriented with respect to resultant wind direction and other weather conditions.

Also as shown in FIG. 4, sensor element 18 may be provided as a plurality of independent runs 32 (FIG. 4 shows two runs 32) so as to enhance the redundancy and reliability of detector 10. In a similar manner and for similar reasons, a plurality of heaters 20 may also be provided.

Figure 5:
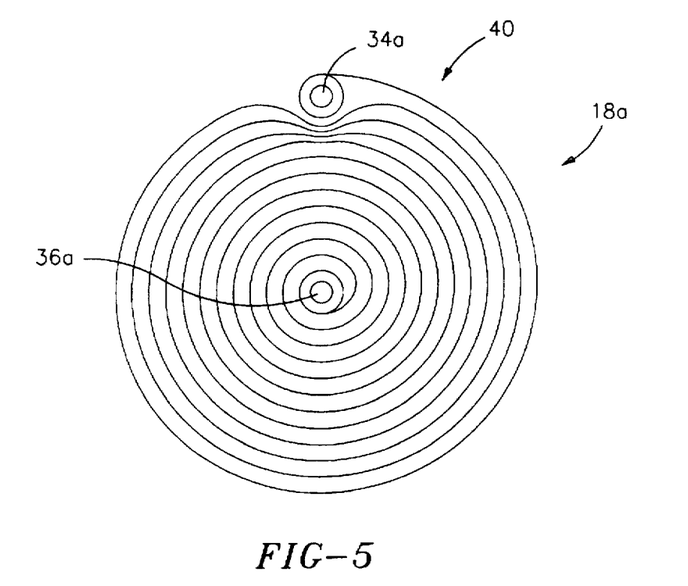
FIG. 5 is a top schematic view of an alternative embodiment similar to FIG. 4.

Referring now to FIG. 5, an alternative embodiment of sensor element 18a is illustrated. As shown, sensor element 18a may alternatively be provided in the form of a spiral run configuration 40 positioned between contacts 34a, 36a. This configuration helps as set forth above to ensure that a portion of run configuration 40 is properly arranged with respect to the resultant direction of wind and other weather conditions. Note that for the sake of simplicity, FIG. 5 illustrates only a single spiral run 40 between contacts 34a, 36a. A plurality of spiral runs 40 may be provided, if desired, for example in a dual spiral configuration so as to provide a plurality of independent runs in a similar manner and for the same reasons as set forth above with respect to the embodiment of FIG. 4.

Figure 6:
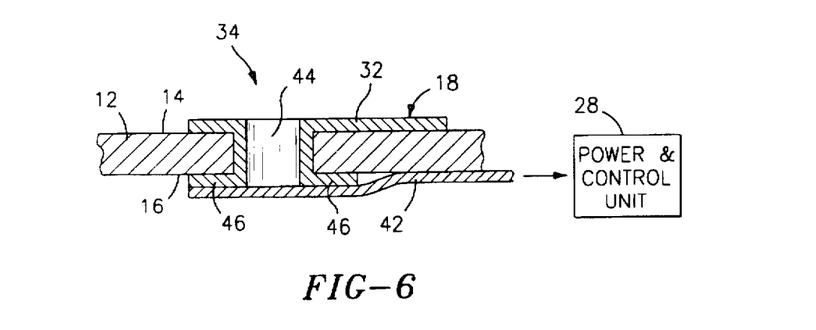
FIG. 6 is a side schematic view illustrating connection of the sensor element in an ice detector according to the present invention.

It is preferable according to the invention to keep first surface 14 of substrate 12 as smooth as possible because first surface 14 in use will be exposed to wind and other weather conditions during detection of ice forming conditions. Non-conformities in first surface 14 can lead to inaccurate detections or non-detections of ice and ice forming conditions. One potential source of non-conformity in first surface 14 is the connection between sensor element 18 and unit 28. According to the invention, sensor element 18 is preferably connected to unit 28 by a connector 42 (FIG. 6) as shown. As shown, sensor element 18 may preferably be plated through a hole 44 in substrate 12 so that a portion 46 of sensor element 18 extends to second surface 16 of substrate 12 for contact with connector 42. In this manner, advantageously, the connection between sensor element 18 and unit 28 does not create non-conformities at first surface 14.

According to the invention, sensor element 18 is preferably provided having a shape or profile selected to maximize the surface area thereof which is exposed to the weather or other conditions to be monitored. It has been found according to the invention that providing an increased exposed surface area of sensor element 18 helps to increase the signal to noise ratio provided by sensor element 18 and thereby to provide enhanced accuracy with respect to the detection of ice and ice forming conditions. Sensor element 18 is preferably provided having a shape sufficient to provide a ratio of exposed surface area to total surface area of at least about 50%, more preferably at least about 70%.

Figure 7:
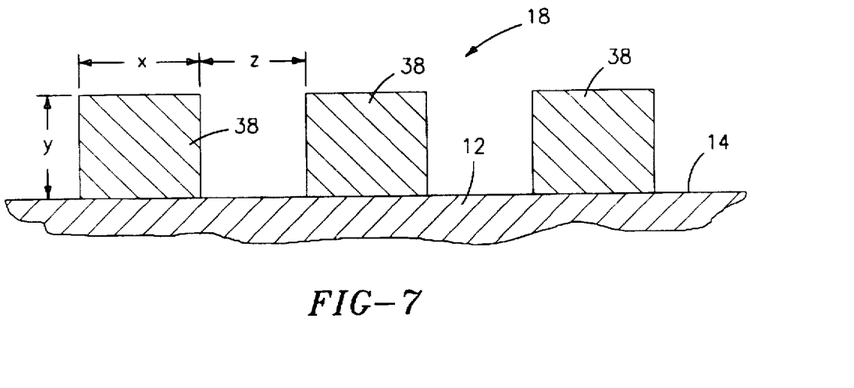
FIG. 7 is a side schematic view illustrating a portion of the sensor element of an ice detector according to the present invention.

FIG. 7 illustrates a portion of detector 10 according to a preferred embodiment of the invention wherein run segments 38 of sensor element 18 are provided having a substantially square wire configuration, that is, having a square shape so that three of the four sides of run segment 38 are exposed to conditions to be monitored. This configuration is readily provided in accordance with the reverse plating technique as discussed above.

In further accordance with the invention, it has been found that run segments 38 having particular width x, height y and gaps z therebetween provide an excellent signal to noise ratio. Gaps z are preferably provided having sufficient size to allow formation of ice between run segments 38. Width x, height y and gaps z are preferably provided according to the invention having a size of between about 0.5 to about 20 mils, preferably between about 2 to about 4 mils. It has been found particularly effective to provide run segments 38 having a height of about 2 or 3 mils and a width of about 3 mils, with gaps between run segments 38 of about 3 mils. A run segment having a height of 2 mils and a width of 3 mils would provide a ratio of exposed surface area to total surface area of about 70%, thereby advantageously providing a relatively high ratio of exposed surface area to total surface area. Of course, other configurations may be used in accordance with the invention, including rectangular, round, semi-round, or other shaped runs as desired.

According to the invention, unit 28 includes a power source and drivers for powering sensor element 18 and heater 20, monitoring or comparator units for measuring voltage drop and/or current through sensor element 18, a processor unit programmed to determine temperature using information obtained from sensor element 18, and a controller for controlling the mode of operation of detector 10. A wide variety of hardware, software and programming techniques are readily available to one of ordinary skill in the art to provide unit 28 as described.

Unit 28 is preferably configured to operate detector 10 in three modes, namely (1) trickle mode for detecting ice forming conditions, (2) pulse mode for detecting the presence of ice, and (3) heating mode for removing ice from sensor element 18. Of course, unit 28 may be configured to provide other functions, if desired.

In trickle mode, unit 28 supplies a known trickle or sense current to sensor 18 and measures temperature of sensor 18 preferably by measuring the voltage drop across sensor 18 which is indicative of resistance and thereby temperature of sensor 18. When the temperature determined is within a range that will permit ice accretion, unit 28 switches detector 10 to pulse mode for detecting ice.

In pulse mode, unit 28 supplies pulses to sensor element 18, preferably generating pulses at least as frequently as one pulse every 2.5 seconds, and measures the response of sensor element 18 to each pulse. The response is processed by unit 28 to determine whether the response indicates ice or no ice. After one or more detections of ice, preferably after two consecutive detections of ice, unit 28 signals detection of ice to the operator of the aircraft, and switches to heating mode.

In heating mode, unit 28 turns heater 20 on and monitors temperature of sensor element 18. Unit 28 turns heater 20 off when the temperature of sensor element 18 reaches a temperature sufficiently above freezing (i.e., indicating that ice on sensor element 18 has been melted and removed). Sensor element 18 is then allowed to cool to ambient temperature and unit 28 returns detector 10 to trickle or pulse mode when the temperature of sensor element 18 reaches measurement temperature.

It should be noted that although unit 28 is schematically illustrated as a single element, several components may in fact be provided separately if desired to perform the functions of unit 28.

Figure 9:
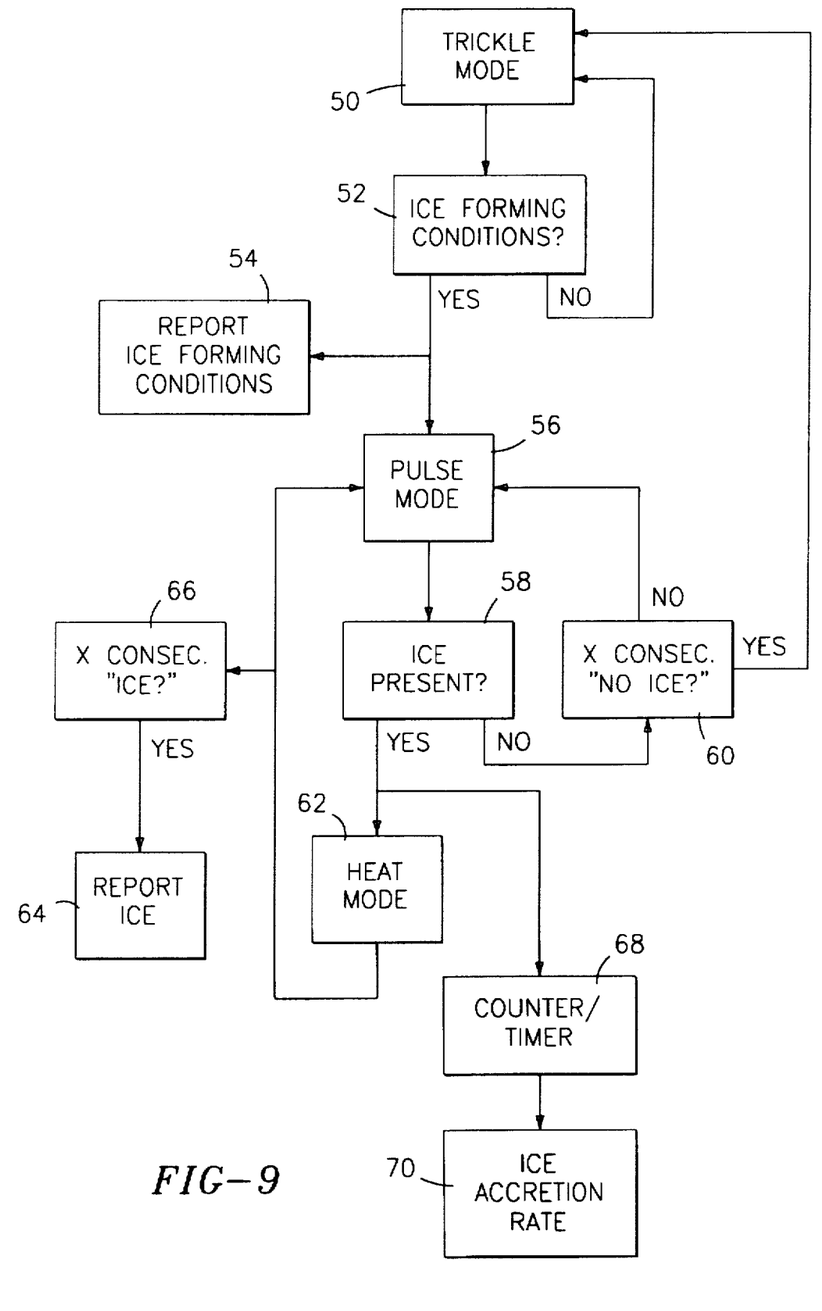
FIG. 9 is a schematic representation of the operation of an apparatus according to the invention.

Referring now to FIG. 9, the operation of detector 10 according to the invention will be described. Detector 10 is positioned at a location to be monitored for ice forming conditions and the presence of ice such as a surface of an aircraft which is particularly susceptible to icing. Detector 10 is initially operated in trickle mode 50 during which a sense or trickle current of known magnitude is passed through sensor element 18, and the voltage drop induced by the trickle current is measured by unit 28 operating in "ice forming conditions" detection mode 52. From the voltage drop, unit 28 determines resistance of sensor element 18 and, from resistance, determines temperature and whether the temperature falls within ice forming conditions. Of course, temperature may be determined in a single direct step depending upon the complexity and programming of unit 28. The trickle current is preferably sufficiently small that sensor element is not heated by the current passing therethrough. An example of a typical trickle current for a nickel sensor element 18 having 3 mil height, width and gaps is about 0.01 amps.

As set forth above, sensor element 18 is provided of a material having a resistance which varies with temperature. By measuring the voltage drop induced by the known trickle current, the resistance of sensor element 18 can be determined, and the temperature of sensor element 18 can then be determined from resistance. In this manner, the temperature of sensor element 18 is monitored according to the invention to determine whether sensor element 18 is exposed to ice forming conditions.

If the detected temperature does not fall within ice forming conditions, detector 10 remains in trickle mode 50 as shown in FIG. 9.

Figure 8:
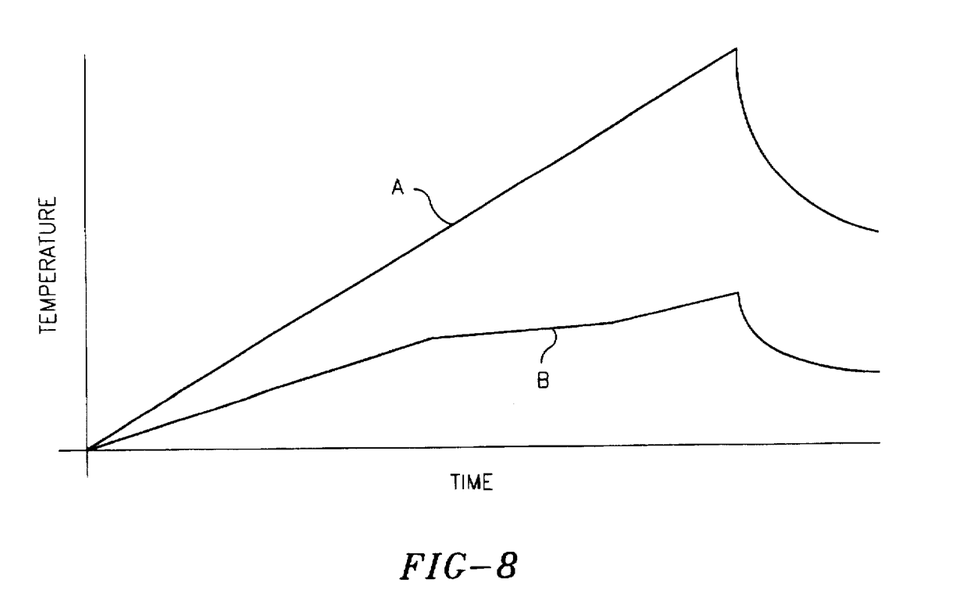
FIG. 8 is a graph illustrating the relation of resistance and temperature over time during heating caused by a pulse according to the invention when the sensor is exposed to dry no-ice conditions and when the sensor is exposed to ice conditions.

Upon the detection of ice forming conditions, unit 28 is preferably configured to report ice forming conditions 54, for example to the operator of a vehicle or aircraft on which detector 10 is being used. At the same time, unit 28 preferably initiates pulse mode 56, wherein pulses of increased current are passed through sensor element 18 to determine whether ice is present on sensor element 18. The magnitude of the pulse is selected based upon the measured temperature of sensor element 18 and the known resistance of same to provide a constant initial current through sensor element 18 which constant initial current is sufficient to rapidly heat sensor element 18. As sensor element 18 is heated, resistance increases and current decreases. Unit 28 monitors the drop in current to determine the resistance and thereby the temperature of sensor element 18 to monitor the temperature increase of sensor element 18 caused by the pulse. The temperature increase exhibited by sensor element 18 will be detectably different depending upon whether sensor element 18 is exposed to normal dry air or to ice. FIG. 8 illustrates a typical comparison between a temperature increase of sensor element 18 exposed to dry air (Curve A), and a temperature increase of sensor element 18 in contact with ice (Curve B). The distinctly different curve illustrated in FIG. 8 is caused by the heat of fusion of ice which has accreted on sensor element 18 which causes a markedly smaller increase in temperature of sensor element 18 when subjected to the same constant initial current. As shown in FIG. 9 at 58, unit 28 determines whether ice is present by monitoring the drop in current from the constant initial current, from which the increase in resistance and consequently the increase in temperature can be determined. Based upon whether unit 28 detects a temperature curve resembling curve A or curve B, a signal is produced by unit 28 indicating "no ice" or "ice".

If no ice is detected, unit 28 preferably returns detector 10 to trickle mode 50 as shown in FIG. 9. Unit 28 may be configured to return detector 10 to trickle mode 50 after a single "no ice" determination, or after a desired number "X" of consecutive "no ice" determinations as indicated in FIG. 9 at 60.

If ice is detected, unit 28 preferably initiates heat mode 62 to remove ice from sensor 18, and then returns detector 10 to pulse mode to continue monitoring for the presence of ice. Unit 28 also preferably is programmed to report ice, as illustrated at 64, to the operator of the aircraft, most preferably after a predetermined number "X" of consecutive ice detections as shown at 66. According to the invention, unit 28 may preferably be configured so that two successive ice detects, (within about 5 seconds, for example), are required before an indication of "ice" is sent to the aircraft operator.

In heat mode 62, unit 28 activates heater 20 so as to rapidly heat sensor element 18 and preferably an area surrounding sensor element 18 to a temperature above the ice formation temperature so as to thereby melt and remove ice build up from and around sensor element 18. Heater 20 is then turned off, and sensor element 18 allowed to return to ambient temperature so that pulse mode 56 can continue for further detection of ice. Due to the size and materials used according to the invention for sensor element 18, heater 20, and substrate 12, as well as the close association between sensor element 18 and heater 20, detector 10 is able to detect ice forming conditions, pulse to detect ice, heat and melt ice, and cool so as to return to pulse mode 56 or trickle mode 50 well within the 60 second requirement which is generally preferred.

As set forth above, detector 10 according to the invention can also be used as an accretion sensor, if desired, so as to determine the icing rate to which detector 10 is exposed. This can be accomplished according to the invention by proportionally heating sensor 18 and raising the temperature of sensor 18 to the same temperature in the same amount of time. Unit 28 can be used to interpolate the icing rate using recent changes in accreted ice thickness as a function of time utilizing a rapid thermal time constant/turn around time due to the proximity and nature of heater 20. For a typical configuration of detector 10 according to the invention, ice will be detected in pulsing mode upon the accretion of about 3.5 to about 4.0 mils of ice. Unit 28 preferably includes a counter/timer 68 for counting the number of ice detections over a set period of time so as to provide a measurement of the ice accretion rate 70 to which detector 10 is exposed. This measurement of accretion rate is facilitated by the rapid return of detector 10 to ice detecting conditions after the heating step. Detector 10 may operate to detect ice, heat and remove ice, and cool to ambient temperature for further ice detection, all within several seconds, thereby providing accurate, reliable and timely measurements as to ice forming conditions, the presence of ice, and ice accretion rate.

It is apparent that there has been provided in accordance with the invention an ice detector for detecting ice and ice forming conditions which is readily applied to planar or curved surfaces of a vehicle for accurately detecting ice and ice forming conditions at the surface, which allows for rapid heating of the ice detecting sensor to remove ice from the sensor and ready the sensor for continued ice detection, which detector is simple in manufacture and both reliable and versatile in use.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An apparatus for detecting ice forming conditions, comprising:

a substrate having a first surface and a second surface;

a sensor disposed on said first surface, said sensor comprising a material having a characteristic which varies in a known manner with respect to temperature; and control means associated with said sensor for monitoring said characteristic and for detecting ice forming conditions from said characteristic, wherein said substrate comprises a substantially flat flexible member, whereby said apparatus is adaptable to conform to non-flat surfaces.

2. An apparatus according to claim 1, wherein said control means further comprises means for detecting ice on said sensor from said characteristic.

3. An apparatus according to claim 2, wherein said control means further comprises means associated with said means for detecting ice, for counting a number of ice detections over a known period of time, and means for determining an ice accretion rate from said number of ice detections over said known period of time.

4. An apparatus according to claim 1, further comprising a heater disposed on said second surface for heating said sensor, and wherein said control means further comprises means for activating said heater after ice forming conditions have been detected, whereby said sensor is readied for additional detection of ice forming conditions.

5. An apparatus according to claim 4, wherein said sensor has a first perimeter, and wherein said heater has a second

11 perimeter, and wherein said second perimeter extends at least partially beyond said first perimeter, whereby an area of said substrate extending beyond said sensor is heated by said heater.

6. An apparatus according to claim 5, wherein said second perimeter encloses a larger area than said first perimeter.

7. An apparatus according to claim 4, wherein said substrate comprises an electrically insulating material whereby said sensor and said heater are electrically insulated from each other.

8. An apparatus according to claim 4 wherein said heater comprises at least one electrically conductive run disposed on said second surface.

9. An apparatus according to claim 8, wherein said at least one electrically conductive run comprises a material selected from the group consisting of nickel, platinum, copper and mixtures thereof.

10. An apparatus according to claim 8, wherein said at least one electrically conductive run comprises a nickel run disposed on said second surface.

11. An apparatus according to claim 1, wherein said substrate comprises a substantially planar member.

12. An apparatus according to claim 1, wherein said substrate comprises a thin sheet member adapted to conform to a desired non-flat surface.

13. An apparatus according to claim 1, wherein said substrate comprises a sheet of flexible electrically insulative and heat conductive material.

14. An apparatus according to claim 1, wherein said substrate comprises a flexible film.

15. An apparatus according to claim 1, wherein said characteristic is resistance, and wherein said control means comprises means for monitoring said resistance and for detecting ice forming conditions from said resistance.

16. An apparatus according to claim 15, wherein said means for monitoring said resistance comprises means for providing a sense current through said sensor and for measuring a voltage drop across said sensor whereby said resistance and temperature of said sensor are determined.

17. An apparatus according to claim 16, wherein said control means further comprises means for detecting ice on said sensor, said means for detecting ice comprising means for providing a pulse of current larger than said sense current through said sensor, and means for measuring a change of said characteristic caused by said pulse, said change being indicative of one of an ice present condition and a no ice present condition.

18. An apparatus according to claim 17, further comprising a heater disposed on said second surface for heating said sensor, and wherein said control means further comprises means for activating said heater responsive to a change indicative of said ice present condition, whereby ice is melted from said sensor.

19. An apparatus according to claim 1, wherein said sensor comprises at least one electrically conductive run disposed on said first surface, said run being made of a material having a resistance which is related in a known manner to temperature, and wherein said control means comprises means for:

providing a known sense current across said run;

measuring a voltage drop across said run;

determining said resistance of said run from said voltage drop; and determining temperature of said run from said resistance.

20. An apparatus according to claim 19, wherein said run comprises a material selected from the group consisting of nickel, platinum, copper and mixtures thereof.

12

21. An apparatus according to claim 19, wherein said run comprises nickel.

22. An apparatus according to claim 19, wherein said run is molecularly bonded to said first surface of said substrate.

23. An apparatus according to claim 19, wherein said run is adhesively bonded to said first surface of said substrate.

24. An apparatus according to claim 19, wherein said run is disposed on said first surface having a first plurality of run segments oriented in a first direction and a second plurality of run segments oriented in a second direction substantially perpendicular to said first direction.

25. An apparatus according to claim 24, wherein said run has a run height and a run width, and wherein run segments of said first and second plurality of run segments are separated by gaps having a gap width, and wherein said run height, run width and gap width are between about 0.5 mils to about 20 mils.

26. An apparatus according to claim 25, wherein said run height is about 2 mils and said run width and said gap width are about 3 mils.

27. An apparatus according to claim 19, wherein said run is disposed on said first surface in a spiral configuration.

28. An apparatus according to claim 19, wherein said run has a substantially square wire configuration.

29. An apparatus according to claim 19, wherein said run has a ratio of exposed surface area to total surface area of at least about 50%.

30. An apparatus according to claim 19, wherein said run has a ratio of exposed surface area to total surface area of at least about 70%.

31. An apparatus according to claim 1, wherein said substrate has connector holes arranged thereon, wherein said sensor has extensions extending through said holes to said second surface, and further comprising connector means for connecting said extensions to said control means.

32. A method for detecting ice forming conditions in an environment at a location of interest, comprising the steps of:

providing a detector comprising a substrate having a first surface and a second surface, and a sensor disposed on said first surface, said sensor comprising a material having at least one characteristic which varies in a known manner with respect to temperature, said substrate comprising a substantially flat flexible member;

positioning said detector at said location with said first surface facing said environment;

monitoring said at least one characteristic to determine said temperature; and indicating whether said temperature indicates ice forming conditions.

33. A method according to claim 32, wherein said characteristic is resistance, and wherein said monitoring step comprises passing a known sense current through said sensor, measuring a voltage drop induced by said sense current, determining said resistance from said voltage drop, and determining said temperature from said resistance.

34. A method according to claim 33, further comprising the step of, upon detecting ice forming conditions, pulsing an increased current through said sensor, monitoring a temperature increase of said sensor responsive to said increased current, and determining whether said temperature increase is indicative of ice on said sensor.

35. A method according to claim 34, further comprising the step of heating said sensor, after an indication of ice on said sensor, to a temperature warmer than said ice forming conditions, and allowing said sensor to return to ambient temperature, whereby ice on said sensor is removed and said sensor is readied for additional detection of ice forming conditions.

36. A method according to claim 35, further comprising the steps of counting a number of indications of ice on said sensor over a preselected period of time, and determining an ice accretion rate from said number of indications of ice over said preselected time.

37. A method according to claim 36, wherein said detector indicates ice on said sensor upon formation of a known constant thickness of ice, and wherein said step of determining said ice accretion rate comprises determining said ice accretion rate from said number of indications of ice and said known constant thickness over said preselected period of time.

38. An apparatus for detecting ice forming conditions, comprising:

a substrate having a first surface and a second surface;

a sensor disposed on said first surface, said sensor comprising a material having a characteristic which varies in a known manner with respect to temperature; and control means associated with said sensor for monitoring said characteristic and for detecting ice forming conditions from said characteristic, wherein said control means further comprises means for detecting ice on said sensor from said characteristic, means associated with said means for detecting ice for counting a number of ice detections over a known period of time, and means for determining an ice accretion rate from said number of ice detections over said known period of time.

39. An apparatus for detecting ice forming conditions, comprising:

a substrate having a first surface and a second surface;

a sensor disposed on said first surface, said sensor comprising a material having a characteristic which varies in a known manner with respect to temperature;

control means associated with said sensor for monitoring said characteristic and for detecting ice forming conditions from said characteristic;

a heater disposed on said second surface for heating said sensor, said control means further comprising means for activating said heater after ice forming conditions have been detected; and wherein said sensor has a first perimeter, and said heater has a second perimeter, and said second perimeter extends at least partially beyond said first perimeter, whereby an area of said substrate extending beyond said sensor is heated by said heater.

40. An apparatus for detecting ice forming conditions, comprising:

a substrate having a first surface and a second surface;

a sensor disposed on said first surface, said sensor comprising a material having a characteristic which varies in a known manner with respect to temperature;

control means associated with said sensor for monitoring said characteristic and for detecting ice forming conditions from said characteristic; and a heater disposed on said second surface for heating said sensor, wherein said control means further comprises means for activating said heater after ice forming conditions have been detected, wherein said heater comprises at least one electrically conductive run disposed on said second surface.

41. An apparatus for detecting ice forming conditions, comprising:

a substrate having a first surface and a second surface;

a sensor disposed on said first surface, said sensor comprising a material having a characteristic which varies in a known manner with respect to temperature; and control means associated with said sensor for monitoring said characteristic and for detecting ice forming conditions from said characteristic, wherein said substrate comprises a substantially planar member.

42. An apparatus for detecting ice forming conditions, comprising:

a substrate having a first surface and a second surface;

a sensor disposed on said first surface, said sensor comprising a material having a characteristic which varies in a known manner with respect to temperature; and control means associated with said sensor for monitoring said characteristic and for detecting ice forming conditions from said characteristic, wherein said substrate comprises a thin sheet member adapted to conform to a desired non-flat surface.

43. An apparatus for detecting ice forming conditions, comprising:

a substrate having a first surface and a second surface;

a sensor disposed on said first surface, said sensor comprising a material having a characteristic which varies in a known manner with respect to temperature; and control means associated with said sensor for monitoring said characteristic and for detecting ice forming conditions from said characteristic, wherein said substrate comprises a sheet of flexible electrically insulative and heat conductive material.

44. An apparatus for detecting ice forming conditions, comprising:

a substrate having a first surface and a second surface;

a sensor disposed on said first surface, said sensor comprising a material having a characteristic which varies in a known manner with respect to temperature; and control means associated with said sensor for monitoring said characteristic and for detecting ice forming conditions from said characteristic, wherein said substrate comprises a flexible film.

45. An apparatus for detecting ice forming conditions, comprising:

a substrate having a first surface and a second surface;

a sensor disposed on said first surface, said sensor comprising a material having a characteristic which varies in a known manner with respect to temperature; and control means associated with said sensor for monitoring said characteristic and for detecting ice forming conditions from said characteristic, wherein said substrate has connector holes arranged thereon, wherein said sensor has extensions extending through said holes to said second surface, and further comprises connector means for connecting said extensions to said control means.

* * * * *